United States Patent
Wang et al.

(10) Patent No.: US 11,708,003 B2
(45) Date of Patent: Jul. 25, 2023

(54) UNMANNED AERIAL VEHICLE BASE STATION SYSTEM AND METHOD

(71) Applicant: SZ DJI TECHNOLOGY CO., LTD., Shenzhen (CN)

(72) Inventors: Mingxi Wang, Shenzhen (CN); Yuan Lin, Shenzhen (CN); Hongju Li, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 620 days.

(21) Appl. No.: 16/505,065

(22) Filed: Jul. 8, 2019

(65) Prior Publication Data

US 2019/0329740 A1    Oct. 31, 2019

Related U.S. Application Data

(63) Continuation of application No. 15/414,101, filed on Jan. 24, 2017, now Pat. No. 10,369,975, which is a continuation of application No. PCT/CN2014/083465, filed on Jul. 31, 2014.

(51) Int. Cl.
| | |
|---|---|
| *B60L 53/80* | (2019.01) |
| *H02J 7/00* | (2006.01) |
| *B64C 39/02* | (2023.01) |
| *B64U 10/13* | (2023.01) |
| *B64U 50/19* | (2023.01) |
| *B64U 70/30* | (2023.01) |
| *B64U 80/70* | (2023.01) |

(52) U.S. Cl.
CPC ............ *B60L 53/80* (2019.02); *B64C 39/024* (2013.01); *H02J 7/0045* (2013.01); *B64U 10/13* (2023.01); *B64U 50/19* (2023.01); *B64U 70/30* (2023.01); *B64U 80/70* (2023.01)

(58) Field of Classification Search
CPC ...................................................... B60L 53/80
See application file for complete search history.

(56) References Cited

U.S. PATENT DOCUMENTS

| | | | |
|---|---|---|---|
| 8,439,301 B1 * | 5/2013 | Lussier | B64C 39/024 89/1.813 |
| 8,511,606 B1 * | 8/2013 | Lutke | B64C 39/024 320/109 |

(Continued)

FOREIGN PATENT DOCUMENTS

| | | |
|---|---|---|
| AU | 2012258299 A1 | 12/2012 |
| CN | 101209551 A * | 7/2008 |

(Continued)

OTHER PUBLICATIONS

The World Intellectual Property Organization (WIPO) International Serach Report for PCT/CN2014/083465 dated Jan. 26, 2015 6 pages.

(Continued)

*Primary Examiner* — Shelley Chen
(74) *Attorney, Agent, or Firm* — Anova Law Group, PLLC (57) ABSTRACT

An unmanned aerial vehicle (UAV) base station includes a housing and a UAV fixation system. The housing includes a top-plate configured for a UAV to land on the top-plate. The UAV fixation system is configured to direct the UAV present on the top-plate to a battery-exchange zone of the top-plate.

20 Claims, 9 Drawing Sheets

(56) References Cited

U.S. PATENT DOCUMENTS

| | | | |
|---|---|---|---|
| 8,862,288 B2 * | 10/2014 | Vavrina | B60L 53/80 414/373 |
| 9,056,676 B1 * | 6/2015 | Wang | B60R 9/00 |
| 9,481,458 B2 * | 11/2016 | Casado Magaña | B64C 39/024 |
| 2004/0211862 A1 * | 10/2004 | Elam | B64D 27/24 244/58 |
| 2009/0067967 A1 * | 3/2009 | Springston | B60L 53/80 414/812 |
| 2011/0057074 A1 | 3/2011 | Woodworth et al. | |
| 2014/0032034 A1 * | 1/2014 | Raptopoulos | H04B 7/18506 701/25 |
| 2014/0117153 A1 | 5/2014 | Childress et al. | |
| 2014/0124621 A1 * | 5/2014 | Godzdanker | B64F 1/12 244/110 E |
| 2014/0129059 A1 * | 5/2014 | Scarlatti | G05D 1/00 701/16 |
| 2014/0319272 A1 * | 10/2014 | Casado Magana | B60L 50/52 244/110 E |

FOREIGN PATENT DOCUMENTS

| | | | | |
|---|---|---|---|---|
| CN | 201590461 U | * | 9/2010 | |
| CN | 102903788 A | * | 1/2013 | |
| CN | 202642094 U | | 1/2013 | |
| CN | 202642094 U | * | 1/2013 | |
| CN | 102909540 A | * | 2/2013 | |
| CN | 102909540 A | | 2/2013 | |
| CN | 103762629 A | * | 4/2014 | |
| CN | 103777564 A | * | 5/2014 | |
| CN | 102738890 B | * | 12/2014 | |
| CN | 102738890 B | | 12/2014 | |
| CN | 102909540 B | | 12/2014 | |
| CN | 102909540 B | * | 12/2014 | |
| CN | 105252545 A | * | 1/2016 | |
| CN | 206155786 U | * | 5/2017 | |
| DE | 102007003458 A1 | | 7/2008 | |
| DE | 102013019098 B3 | * | 1/2015 | A01B 79/005 |
| DE | 102013019098 B3 | | 1/2015 | |
| EP | 2644438 A2 | | 10/2013 | |
| EP | 2664539 A1 | * | 11/2013 | B60L 11/1822 |
| EP | 2664539 A1 | | 11/2013 | |
| GB | 201410443 | * | 7/2014 | |
| JP | 2000050423 A | * | 2/2000 | |
| JP | 2013203394 A | | 10/2013 | |
| JP | 2013241177 A | * | 12/2013 | B60L 11/1822 |
| JP | 2013241177 A | | 12/2013 | |
| JP | 2014031118 A | | 2/2014 | |
| JP | 2015042539 A | | 3/2015 | |
| KR | 1705838 B1 | * | 2/2017 | B64C 25/32 |
| WO | WO-0025948 A1 | * | 5/2000 | B08B 15/002 |
| WO | 2012130790 A2 | | 10/2012 | |
| WO | WO-2018145261 A1 | * | 8/2018 | B64D 47/08 |

OTHER PUBLICATIONS

Tuna Toksoz et al., Automated Battery Management System for Enabling Multi-Agent Persistent Missions, Aerospace Controls Laboratory, Massachusetts Institute of Technology, http://acl.mit.edu/projects/recharge.htm.

Nigel Cochran et al., Automated Refueling for Hovering Robots, Faculty of the Worcester Polytechnic Institute, Mar. 13, 2012, http://www.wpi.edu/Pubs/E-project/Available/E-project-031212-181154/unrestricted/Automated_Refueling_for_Hovering_Robots.pdf.

Kurt A. Swieringa, et al., Autonomous Battery Swapping System for Small-Scale Helicopters, 2010 IEEE International Conference on Robotics and Automation, Anchorage Convention District, May 3, 2010, http://diyhpl.us/~bryan/papers2/paperbot/56dc111cbf4502d5666c7f3dab6647fc.pdf.

Tuna Toksoz, et al., Automated Battery Swap and Recharge to Enable Persistent UAV Missions, Jul. 3, 2015, http://dspace.mit.edu/openaccess-disseminate/1721.1/81474.

Skycatch, Inc., Ground Station Trials, Feb. 3, 2014, https://www.facebook.com/media/set/?set=a.499572130152750.1073741846.337070333069598&type=3.

Skycatch, Inc., Platform Ground Stations, Operates 100% autonomously Requires no Human Interaction.

Koji A. O. Suzuki, et al., Automatic Battery Replacement System for UAVs: Analysis and Design, Journal of Intelligent & Robotic Systems, Sep. 9, 2011, pp. 563-586, Springer.

The European Patent Office (EPO) The Extended European Search Report for 14898651.6 dated Jul. 13, 2017 7 pages.

* cited by examiner

Fig. 9

UNMANNED AERIAL VEHICLE BASE STATION SYSTEM AND METHOD

CROSS-REFERENCE TO RELATED APPLICATIONS

This application is a continuation of application Ser. No. 15/414,101, filed on Jan. 24, 2017, which is a continuation application of International Application No. PCT/CN2014/083465, filed on Jul. 31, 2014, the entire contents of both of which are incorporated herein by reference.

FIELD

The present disclosure relates generally to unmanned aerial vehicles (UAVs) and more specifically, but not exclusively, to UAV base stations and methods related thereto.

BACKGROUND

Conventional unmanned aerial vehicles (UAVs) have limited flight time because their battery life is often limited to ten to thirty minutes at the most. When a battery is expended, the UAV needs to land, and the expended battery needs to be exchanged by a user or recharged before the UAV can operate again.

The necessity for frequent user interaction to maintain and exchange batteries of one or more UAVs is not suitable where extended duty times are required or where extended autonomous operation is desired for a fleet of UAVs.

In view of the foregoing, a need exists for an improved UAV base station system and method for autonomous exchange of UAV batteries in an effort to overcome the aforementioned obstacles and deficiencies of conventional UAV systems.

SUMMARY

In accordance with the present disclosure, there is provided an unmanned aerial vehicle (UAV) base station includes a landing surface for enabling a UAV having a UAV battery pack to land on the landing surface and a battery-exchange system including a battery-matrix and a mechanical mechanism. The battery-matrix includes a plurality of battery-slots, each of which is configured to removably hold a UAV battery pack. The mechanical mechanism is configured to interact with a selected UAV battery pack of the battery-exchange system and the UAV battery pack of the UAV.

Also in accordance with the present disclosure, there is provided a method of inserting a UAV battery pack into a UAV. The method includes a mechanical mechanism moving along an X-axis and Y-axis to the UAV battery pack disposed in a selected battery-slot, the mechanical mechanism extending a battery-carriage along a Z-axis and grasping the UAV battery pack, the mechanical mechanism retracting the battery-carriage along the Z-axis to remove the UAV battery pack from the battery-slot, and the mechanical mechanism moving the UAV battery pack proximate to the UAV and inserting the UAV battery pack into a UAV battery-slot disposed on the UAV and decoupling from the UAV battery pack.

Also in accordance with the present disclosure, there is provided a method of removing a UAV battery pack from a UAV and storing the UAV battery pack. The method includes a mechanical mechanism moving proximate to the UAV having the UAV battery pack disposed in a UAV battery-slot of the UAV, the mechanical mechanism grasping the UAV battery pack disposed in the UAV battery-slot, the mechanical mechanism retractably removing the UAV battery pack from the UAV battery-slot, the mechanical mechanism moving along an X-axis and Y-axis to a selected UAV battery-slot, and the mechanical mechanism extending the battery-carriage along a Z-axis to insert the UAV battery pack in the selected UAV battery-slot.

Also in accordance with the present disclosure, there is provided a UAV base station including a housing and a UAV fixation system. The housing at least includes a top-plate configured for a UAV to land on the top-plate. The UAV fixation system is configured to direct the UAV present on the top-plate to a battery-exchange zone of the top-plate.

Also in accordance with the present disclosure, there is provided a portable UAV base station including a battery-exchange system including a battery-matrix and a mechanical mechanism, a housing, and a UAV fixation system. The battery-matrix includes a plurality of battery-slots, each of which is configured to removably hold a UAV battery pack. The mechanical mechanism is configured to interact with the UAV battery pack. The housing at least includes a top-plate configured for a UAV to land on the top-plate. The UAV fixation system is configured to direct the UAV present on the top-plate to a battery-exchange zone of the top-plate.

It should be noted that the figures are not drawn to scale and that elements of similar structures or functions are generally represented by like reference numerals for illustrative purposes throughout the figures. It also should be noted that the figures are only intended to facilitate the description of the exemplary embodiments. The figures do not illustrate every aspect of the described embodiments and do not limit the scope of the present disclosure.

DETAILED DESCRIPTION OF THE EMBODIMENTS

Since currently-available unmanned aerial vehicles (UAV) systems are deficient because they fail to provide extended battery life and fail to support battery swapping and recharging, a UAV base station that provides autonomous battery swapping can prove desirable and provide a basis for a wide range of UAV applications, such as the ability for UAV systems to perform longer autonomous missions. This result can be achieved, according to one embodiment disclosed herein, by a UAV base station 100 as illustrated in FIG. 1.

Figure 1:
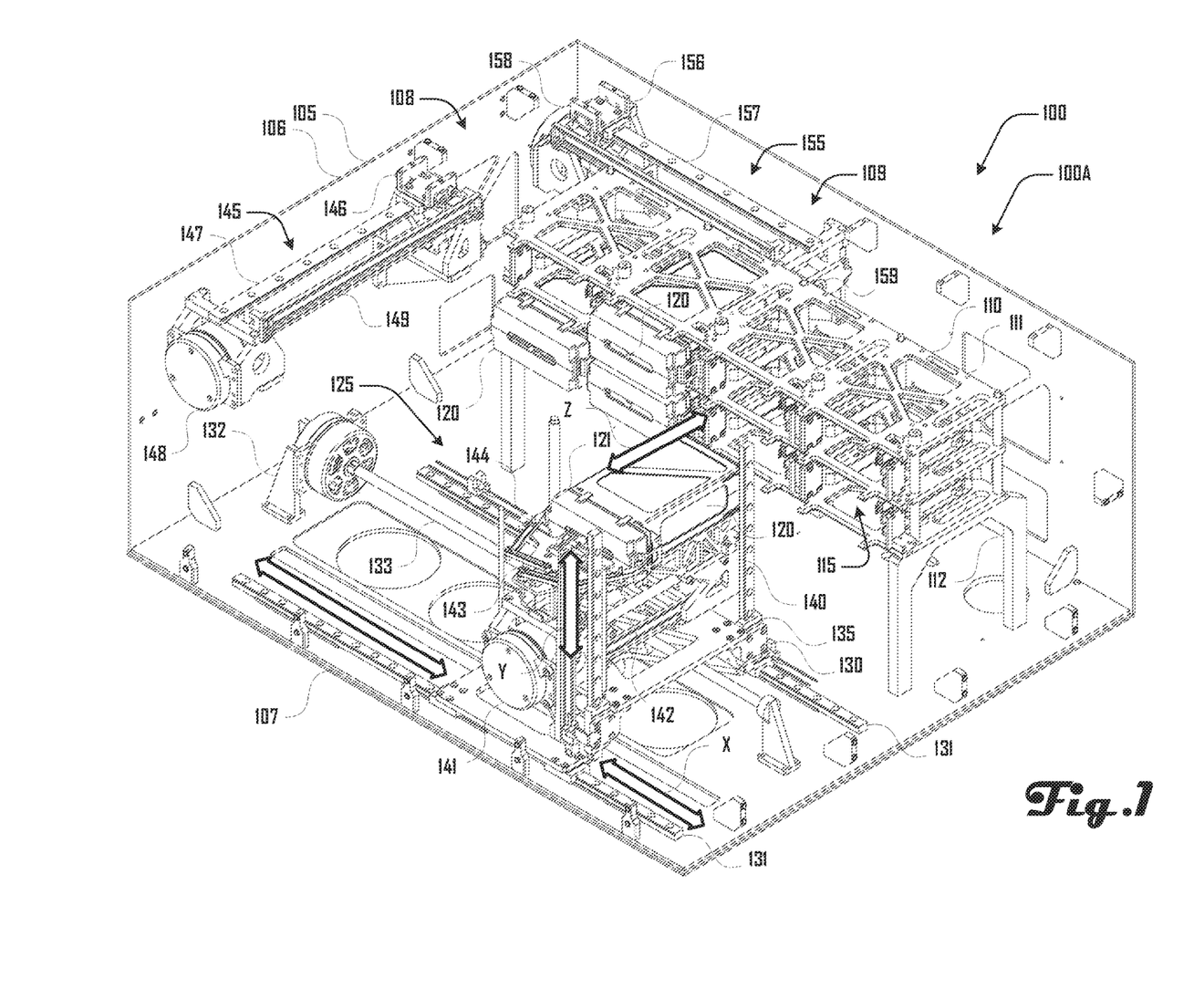
FIGS. 1 and 2 are exemplary perspective drawings illustrating an internal portion of an embodiment of a base station for unmanned aerial vehicles (UAVs).
Figure 2:
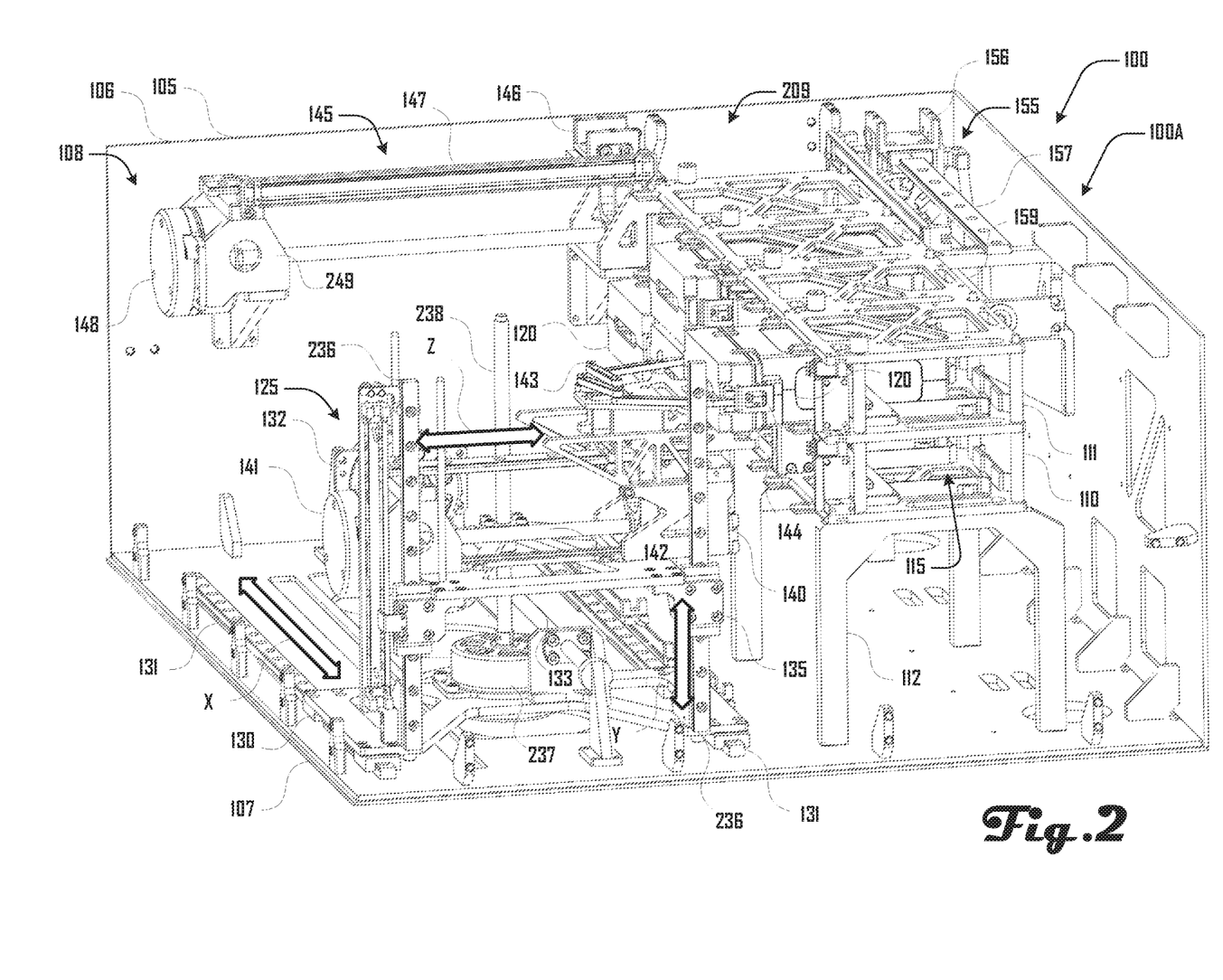

Turning to FIGS. 1 and 2, the UAV base station 100 is shown as having a housing 105 that comprises a plurality of sidewalls 106 and a base 107. The sidewalls 106 and the base 107 cooperatively define a housing cavity 108 in which a plurality of components can disposed including a battery-exchange system 109. The battery-exchange system 109 comprises a battery-holder 110 that includes a battery-matrix 111 that is offset from the base 107 by legs 112.

The battery-matrix 111 forms a plurality of battery-slots 115 that are each configured to hold a battery-pack 120. For example, as depicted in FIG. 1, the battery-matrix 111 comprises two stacked rows of battery-slots 115, where each row comprises four battery-slots 115. Although a specific configuration of a battery-matrix 111 is shown and described with reference to FIGS. 1 and 2, for purposes of illustration only, any suitable arrangement of a battery-matrix 111 may be provided. The battery matrix 111 can include any suitable number of battery-slots 115. The number can depend on the number of UAVs, charging time of a battery pack 120, desired mission time, or the like. For example, some embodiments may include fewer battery-slots 115 or may include many more battery-slots 115. Battery-slots 115 may have any suitable size and/or shape based on the type of battery-pack 120 for being held therewithin, and, in some embodiments, a battery-matrix 111 may be configured to hold a plurality of uniform and/or different battery pack types, which may include different shapes, cross sections, voltages, currents, or the like. In some embodiments, there may be any suitable number of rows and/or columns in a battery-matrix 111, and further embodiments may include battery-slots 115 in any other suitable regular or non-regular configuration, that may or may not include rows or columns. In some embodiments, there may be a plurality of battery-matrices 111, or a battery-matrix 111 may be three dimensional compared to the two dimensional arrangement depicted herein (i.e., a first dimension of rows, and a second dimension of columns).

Figure 7:
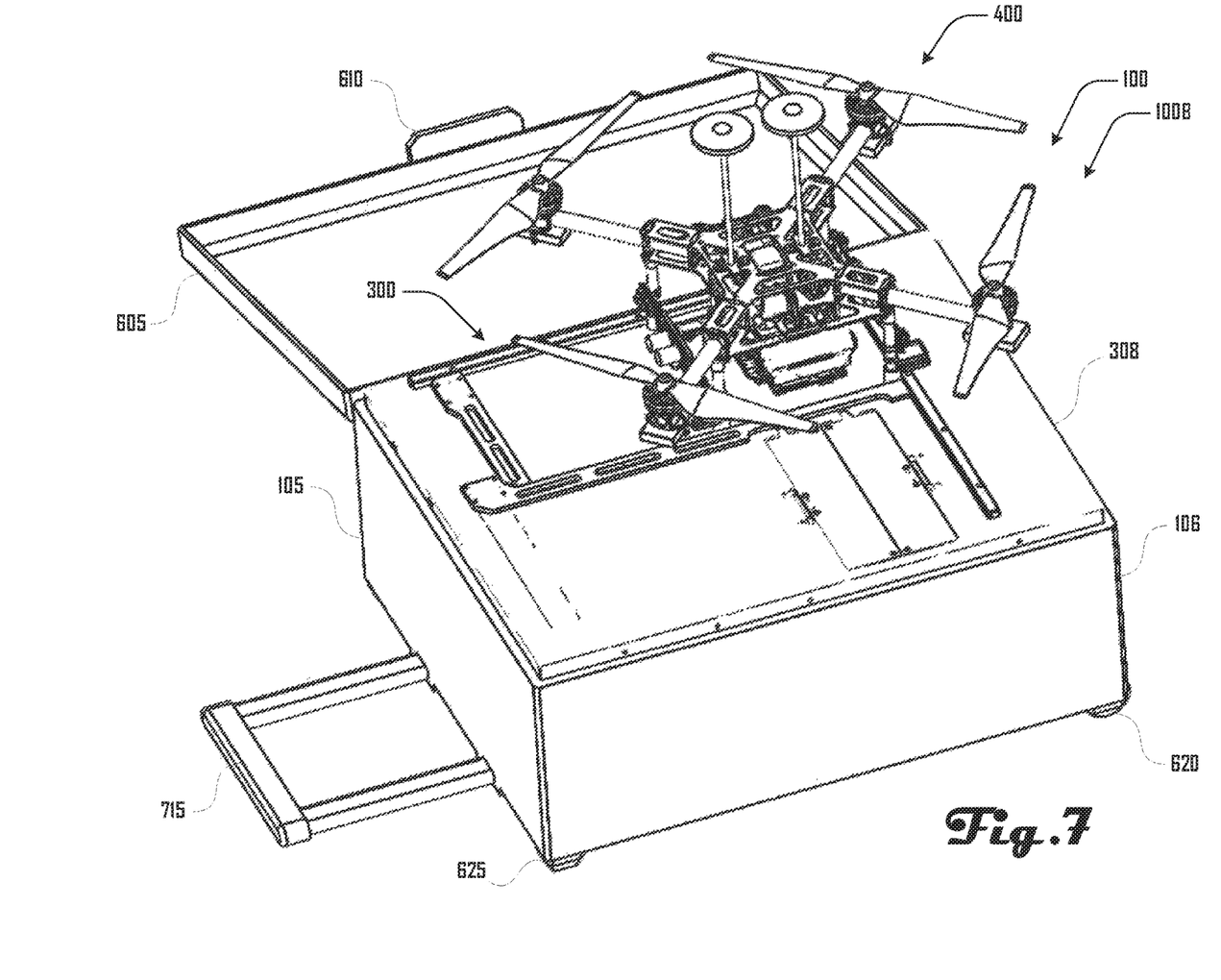
FIG. 7 is a perspective drawing illustrating an embodiment of the UAV base station of FIGS. 6*a-c*, wherein the UAV base station includes a UAV docked thereon.

The battery-exchange system 109 of FIGS. 1 and 2 further is shown comprising a mechanical mechanism, such as robotic arm system 125, that is configured to selectively remove batteries 120 from respective battery-slots 115, insert batteries 120 into respective battery-slots 115, and/or remove or couple batteries with a UAV 400 (shown in FIG. 7) as discussed in further detail herein. The embodiment depicted herein includes a Cartesian robotic arm with three degrees of freedom.

For example, the robotic arm system 125 can include a base-cart 130 that is configured to translate linearly along a pair of base-rails 131 via an X-motor 132 and rotating X-shaft 133 that drives movement of the base-cart 130 along an X-axis. The robotic arm system 125 of FIGS. 1 and 2 also is shown as further comprising an elevator-carriage 135 that is configured to translate linearly on elevator-rails 236 via a Y-motor 237 and rotating Y-shaft 238 that drives movement of the elevator-carriage 135 along a Y-axis. The elevator-rails 236 extend from and move with the base-cart 130.

As shown in FIGS. 1 and 2, the robotic arm system 125 can comprise a battery-carriage 140 that is coupled with the elevator-carriage 135 and configured to translate linearly via a Z-motor 141 and rotating Z-shaft 142 that drives movement of the battery-carriage 140 along a Z-axis. The battery-carriage 140 can also include a battery-grabber 143 that is operable to couple with an end region 121 of a selected battery-pack 120 so that batteries 120 can be selectively moved and distributed by the robotic arm system 125. The battery-grabber 143 comprises a pair of grabber-arms 144 that are configured to grab the end region 121 of batteries 120 and pull the selected battery pack 120 out of the relevant battery-slots 115, or to insert the selected battery pack 120 into the battery-slots 115 and/or release the battery packs 120.

Although FIGS. 1 and 2 depict a battery-carriage 140 that holds a single battery pack 120, in some embodiments, a battery-carriage 140 may be configured to hold a plurality of battery packs 120. For example, it may be desirable to remove an expended battery pack 120 from a UAV 400 and provide a new (or charged) battery pack 120 to the UAV 400 in a single transaction. Accordingly, in some embodiments, the battery-carriage 140 may be configured to remove and hold the expended battery pack and also to hold a charged battery pack 120 to replace the removed battery pack 120 without an intermittent retrieval of a new battery pack 120 from within the housing 105.

Figure 3:
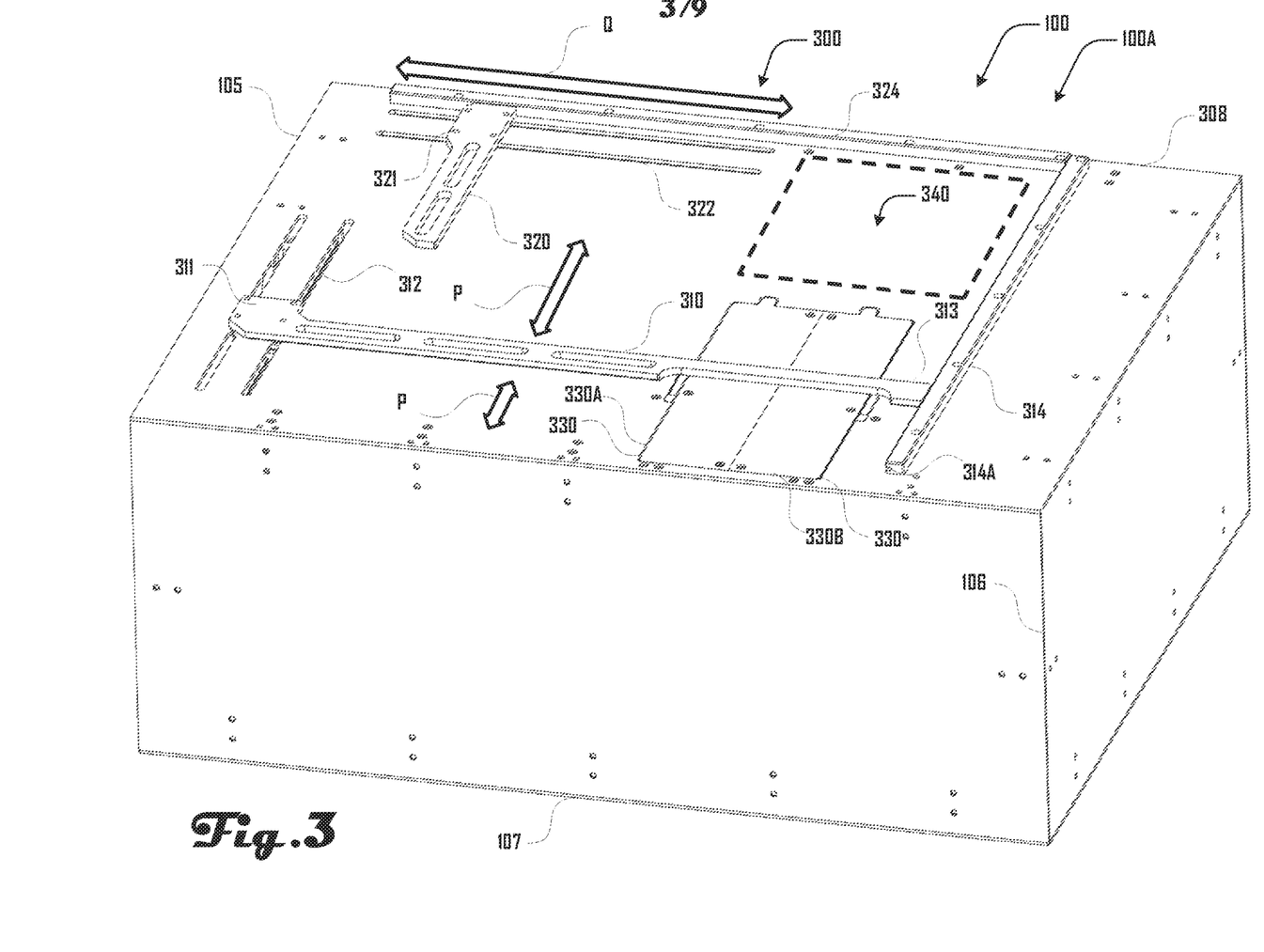
FIG. 3 is an exemplary perspective drawing illustrating an external portion of the embodiment of the UAV base station of FIGS. 1 and 2.
Figure 4:
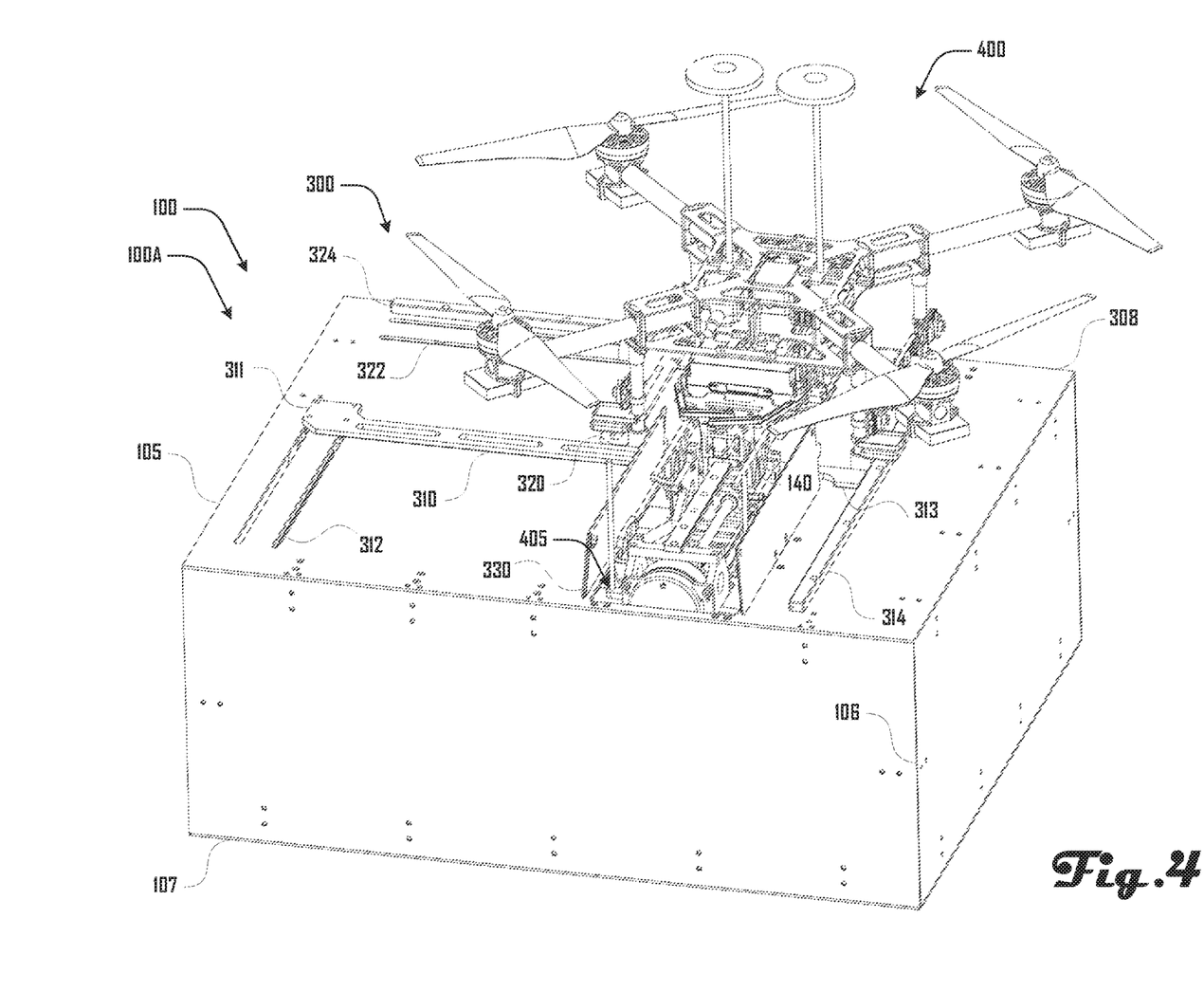
FIG. 4 is an exemplary perspective drawing illustrating an embodiment of a UAV base station of FIG. 3, wherein the UAV base station includes a UAV docked thereon.

Additionally, some embodiments include one or more fixation-arm-actuation systems 145, 155 are disposed within the housing cavity 108 on respective sidewalls 106. As depicted in FIGS. 3 and 4 and as discussed herein the fixation-arm-actuation systems 145, 155 may be used to move a UAV 400 to a position on the housing 105 where battery packs 120 can be exchanged.

The fixation-arm-actuation system 145 comprises a fixation-carriage 146 that is operable to translate on a first fixation-rail 147 via a fixation-motor 148 and fixation-rail 149. The fixation-motor 148 rotates the first fixation-shaft 149, which in turn moves the fixation-carriage 146 along the fixation-rail 149.

Additionally or alternatively, the fixation-arm-actuation system 155 comprises a fixation-carriage 156 that is operable to translate on a fixation-rail 157 via a fixation-motor 158 and fixation-rail 159. The fixation-motor 158 rotates the fixation-shaft 159, which in turn moves the fixation-carriage 156 along the fixation-rail 159.

Although two fixation-arm-actuation systems 145, 155 are depicted in FIGS. 1 and 2, in further embodiments, there may be one or any suitable plurality of fixation-arm-actuation systems 145, 155 disposed in any suitable location and on other portions of the housing 105.

As depicted in FIGS. 3 and 4, first and second fixation arm 310, 320 extend through respective slots 312, 322 that are defined by a top-plate 308 that further defines the housing 105. The first and second fixation arm 310, 320 are coupled with respective fixation-carriages 146, 156 (FIGS. 1 and 2) of the fixation-arm-actuation systems 145, 155 shown in FIGS. 1 and 2. These components collectively define a UAV fixation system 300.

In various embodiments, the UAV fixation system 300 may be operable to direct a UAV 400 disposed on the top-plate 308 to a battery pack exchange zone 340 of the top-plate 308 as shown in FIG. 3. FIG. 4 depicts the UAV 400 disposed in the exchange zone 340. Having a UAV fixation system 300 may be advantageous in various embodiments because the UAV fixation system 300 may provide for low accuracy landing of a UAV 400 on the top-plate 308 while subsequently providing for fast movement to the battery pack exchange zone 340. The UAV battery-pack 120 thereby can be exchanged via the battery pack exchange system 109 (shown in FIGS. 1 and 2). In various embodiments, a UAV fixation system 300 may provide for faster landing of the UAV 400 and faster battery pack exchange compared to requiring precise landing of the UAV 400 in the battery pack exchange zone 340, which may take more time compared to a low accuracy landing and subsequent positioning with the UAV fixation system 300.

In further embodiments, the UAV fixation system 300 may comprise one or more fixation arm 310, 320 that is operable to move one or more UAV 400 disposed on the top-plate 308 to one or more battery pack exchange zone 340. For example, the UAV base station 100 may comprise a plurality of battery pack exchange zones 340 (e.g., at four corners of the top-plate 308) and the UAV fixation system 300 may be operable to move UAVs 400 that land on the top-plate 308 to any of these battery pack exchange zones 340. The UAV base station 100 may therefore be operable to accommodate a plurality of UAVs 400 simultaneously on the top plate 308). In a further embodiment, the UAV fixation system 300 may be configured to queue a plurality of UAVs proximate to a battery pack exchange zone 340.

As illustrated in FIG. 3, the first fixation arm 310 is operable to translate along axis P, and the second fixation arm 320 physically extends in a direction that is substantially perpendicular to the axis P. A first end region 311 of the first fixation arm 310 extends through slots 312 and is coupled to the first fixation-arm-actuating system 145 disposed in the housing cavity 108 (shown in FIGS. 1 and 2). A second end region 313 of the first fixation arm 310 may abut or slidably reside within a slot 314A of a first fixation rim 314.

Similarly, the second fixation arm 320 is operable to translate along an axis Q, and the second fixation arm 320 extends in a direction that is substantially perpendicular to the axis Q. A first end region 321 of the second fixation arm 320 extends through slots 322 and is coupled to the second fixation-arm-actuating system 155 disposed in the housing cavity 108 (FIGS. 1 and 2). A second fixation rim 324 may be positioned proximate to the first end region 321.

The UAV fixation system 300 may initiate operation by determining that a selected UAV 400 has landed on the top-plate 308. For example, the first and second fixation arms 310, 320 may begin in a landing configuration, positioned at a distal-most position opposing the battery pack exchange zone 340, and a determination is made that the UAV 400 has landed within the area defined by the first and second fixation arms 310, 320 and the first and second fixation rims, 314, 324. The first and second fixation arms 310, 320 can then move toward the battery pack exchange zone 340 and thereby physically contact and guide the UAV 400 to the battery pack exchange zone 340 as depicted in FIG. 4. The first and second fixation rims, 314, 324 also serve as guides for moving the UAV 400 in the battery pack exchange zone 340. In various embodiments, the UAV 400 may be held in the battery pack exchange zone 340 by the first and second fixation arms 310, 320 and/or the first and second fixation rims, 314, 324.

Figure 5:
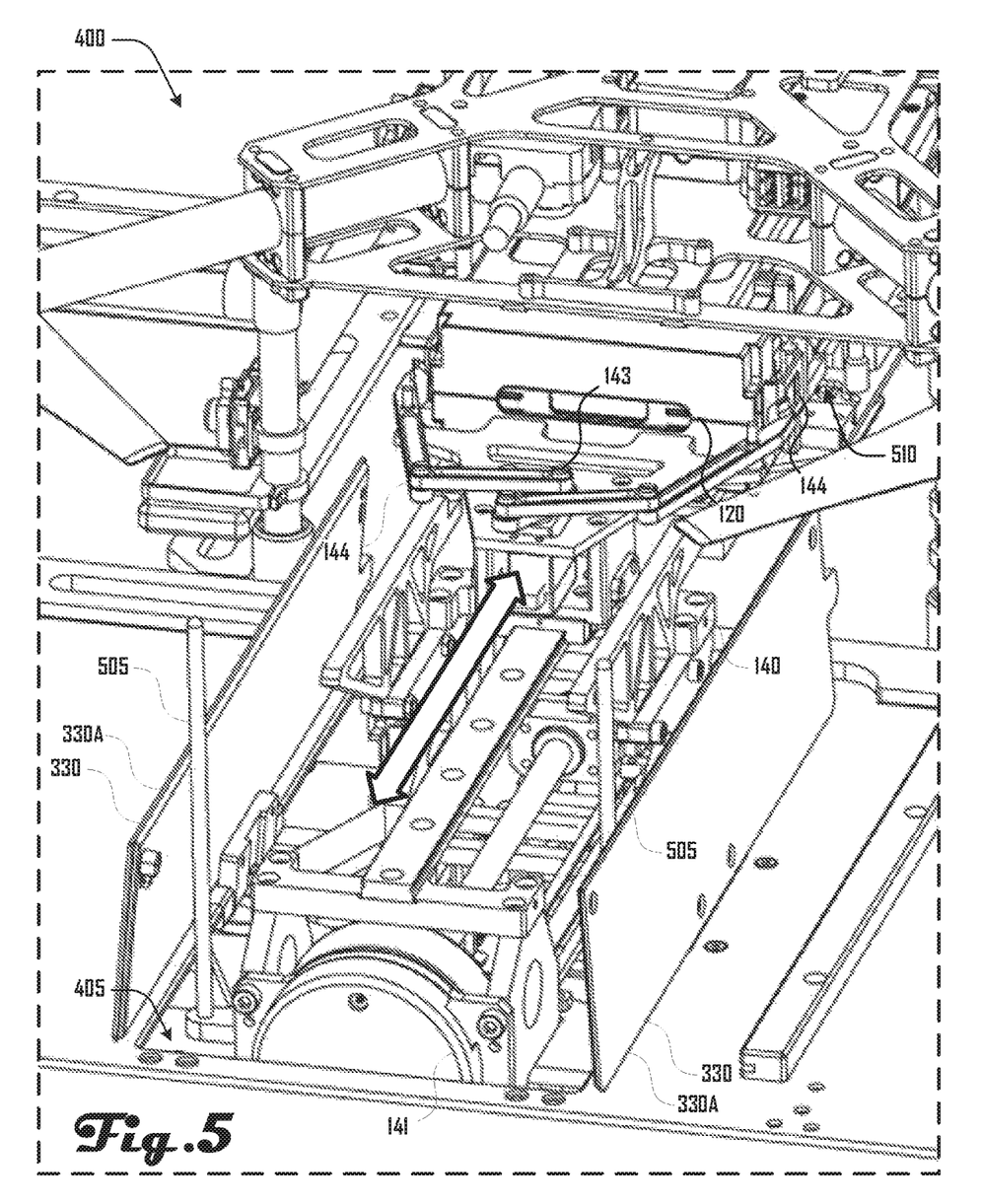
FIG. 5 is a close-up perspective drawing illustrating portions of the UAV base station and the UAV of FIG. 4.
Figure 6A:
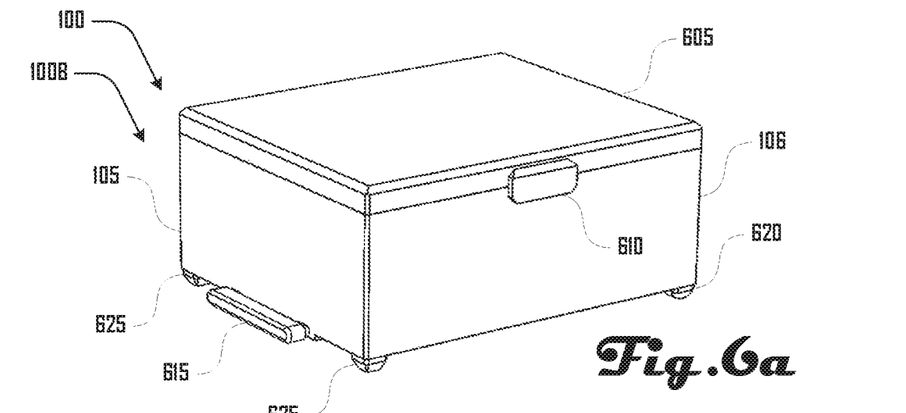
FIGS. 6*a-c* are perspective drawings illustrating another embodiment the UAV base station, wherein the UAV base station includes a lid, draw bar and/or wheels.
Figure 6B:
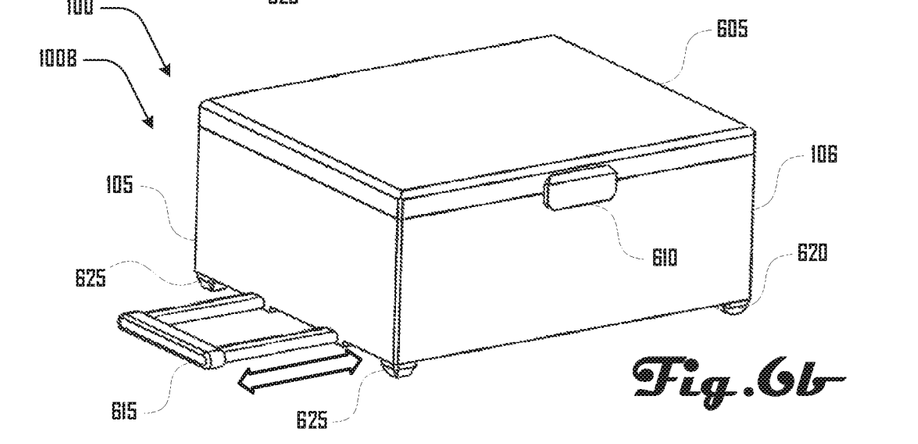
Figure 6C:
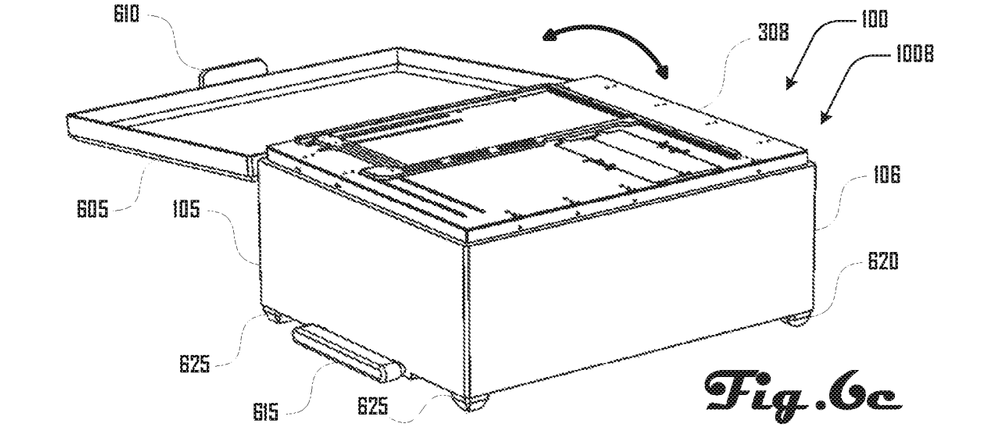

As shown in FIGS. 4 and 5, the top-plate 308 may define a hatch 405, which is an opening formed in the top-plate 308. The hatch 405 extends into and provides access between the housing cavity 108 and a portion of the housing 105 above the top-plate 308. First and second hatch covers 330A, 330B can cover the hatch 405. For example, FIG. 3 depicts the hatch covers 330 in a closed configuration, and FIGS. 4 and 5 depict the hatch covers 330 in an open configuration.

In various embodiments, the hatch doors 330 may be biased toward the closed configuration and may be pushed open by the robotic arm system 125. As shown in FIG. 5, hatch-door actuators 505 may be rods positioned on the elevator-carriage 135 (FIGS. 1 and 2) for opening hatch doors 330. For example, returning to FIGS. 1 and 2, after pulling the selected battery-pack 120 out of a battery-slot 115 and positioning the battery-pack 120 on the battery-carriage 140, the robotic arm system 125 may move under the hatch 405 as shown in FIGS. 4 and 5). The elevator-carriage 135 may then extend upward toward the hatch 405 with the hatch-door actuators 505 contacting the hatch doors 330 and moving the hatch doors 330 to the open configuration as the elevator-carriage 135 extends upward.

As illustrated in FIGS. 4 and 5, a portion of the robotic arm system 125 may extend through the hatch 405 to facilitate battery pack exchange with the UAV 400 that is disposed on the top-plate 308. For example, in one aspect of the battery pack exchange, the battery carriage 140 may be empty while extending through the hatch 405 and then the battery carriage 140 may extend toward and grasp a discharged battery-pack 120 that is disposed in the battery-slot 510 of the UAV 400. In another aspect of battery pack exchange, the battery carriage 140 may have a charged battery-pack 120 disposed thereon while extending through the hatch 405 and then the battery carriage 140 may extend toward an empty UAV battery-slot 510 of the UAV 400 and load the charged battery-pack 120 into the UAV battery-slot 510. Accordingly, FIGS. 4 and 5 may depict a battery-pack 120 being loaded onto the UAV 400 and/or may depict a battery-pack 120 being removed from the UAV 400.

The battery-exchange system 109 and UAV fixation system 300 described herein can be used in a UAV base station 100 (shown in FIGS. 1 and 2) of various sizes and shapes. For example, in some embodiments, the UAV base station 100 may be as large as a building and may comprise a one or more battery-exchange systems 109 and/or UAV fixation systems 300. However, in some embodiments, the battery-exchange system 109 and UAV fixation system 300 described herein may be adapted for compact and portable UAV base stations 100 such as the embodiment 100B depicted in FIGS. 6a-c and FIG. 7.

Turning to FIGS. 6a-c and FIG. 7, in such an embodiment 100B, the housing 105 may be the size and dimensions of conventional luggage and components of the UAV base station 100 may be light weight. The housing 105 may also comprise a top-plate cover 605 that is configured to removably cover the top-plate 308. The top-plate cover 605 can be rotatably coupled to the housing 105 as depicted in FIGS. 6a-c and FIG. 7, but a top-plate cover 605 may alternatively be completely removable, comprise a plurality of portions, or have any other suitable configuration for selectively covering the top-plate 308. The top-plate cover 605 may also include a latch 610 for securing the top-plate cover 605 in a closed configuration.

Additionally, the housing 105 may comprise an extendible draw-bar 615 along with wheels 620 and/or legs 625 that provide for further enhanced portability of the base station 100B. For example, the base station 100B may be transported by holding the extended draw-bar 615 and rolling the housing 105 along the ground via the wheels 620 or carrying the base station 100B via the draw-bar 615. A light-weight and portable base station 100B may be advantageous because the base station 100B can be more easily transported via conventional transportation and/or can be setup to support UAVs 400 in locations where larger and heavier base stations 100 might be impractical. For example, the example embodiment base station 100B may be transported in a conventional vehicle to a desired location and setup on the top of the vehicle (not shown), in a truck-bed of the vehicle, or the like.

As discussed herein, a UAV base station 100 may support one or more UAV 400 (shown in FIG. 4). For example, the battery-exchange system 109 may provide for the automated exchange of batteries 120 (shown in FIGS. 1 and 2), without user interaction, for one or more UAV 400 such that the one or more UAV 400 may remain powered and operable for extended periods of time with no or limited user interaction. Accordingly, in addition to including one or more battery-pack 120 configured for exchange in one or more UAV 400, the UAV base station 100 may also include a separate power supply (not shown) for charging the one or more batteries 120 that may be present in the UAV base station 100 and/or for powering various components of the UAV base station 100. Such a power supply may comprise any conventional type of power supply, such a battery, a generator, a solar cell, a connection to a power grid, or the like. Accordingly, in various embodiments, the battery-matrix 110 and one or more of the battery-slots 115 may be configured to charge one or more battery back 120

The UAV base station 100 may also support one or more UAV 400 in various other ways. For example, the UAV base station 100 may be operably connected to the UAV 400 via a wired or wireless connection, such that the UAV 400 may communicate with the base station 100 or the UAV 400 may be operable to communicate via a larger network such as the Internet, a satellite network, or the like. In one embodiment, the UAV may wirelessly communicate with one or more UAV 400 via a local wireless network such as Wide Fidelity (WiFi) network, and the base station 100 may be operably connected to the Internet or other suitable network.

Such connectivity may be desirable so that the UAV 400 may provide data to remote operators, including position data, audio data, image data, temperature data, thermal data, radiological data, RaDAR data, LiDAR data, and/or the like. Such connectivity may also allow a user to remotely operate or otherwise program or provide instructions to a UAV 400 or base station 100.

The UAV base station 100 may also include other sensors, which may be operable to provide data to one or more UAVs 400 or to remote operations. For example, the UAV base station 100 may also comprise a GPS unit, compass, accelerometer, RaDAR system, LiDAR system, and/or the like. Additionally, in various embodiments, the UAV base station 100 may be configured to store one or more UAV 400 within the housing cavity 108, or other portion of the housing 105.

In addition to providing for the exchange of batteries 120, the UAV base station 100 may be advantageously configured for automated exchange or supply of other selected items. For example, a battery-exchange system 109 as described herein may be used or adapted to exchange, supply, or re-supply fuel, memory devices, weaponry, and/or the like. In some embodiments, UAVs 400 may be tasked with discharging or providing liquids, gasses or solids to an area and the UAV base station 100 may be operable to supply such liquids, gasses and/or solids to one or more UAV 400.

Additionally, UAVs 400 may be reconfigurable, and the UAV base station 100 may be operable to configure the UAVs 400. For example, a UAV 400 may configured to modularly and optionally carry a camera, audio system, weapons system, liquid discharge system, gas discharge system and/or the like, and the UAV base station 100 may be operable to configure the UAV 400 accordingly and provide the UAV 400 with one or more desired component or module.

Figure 8:
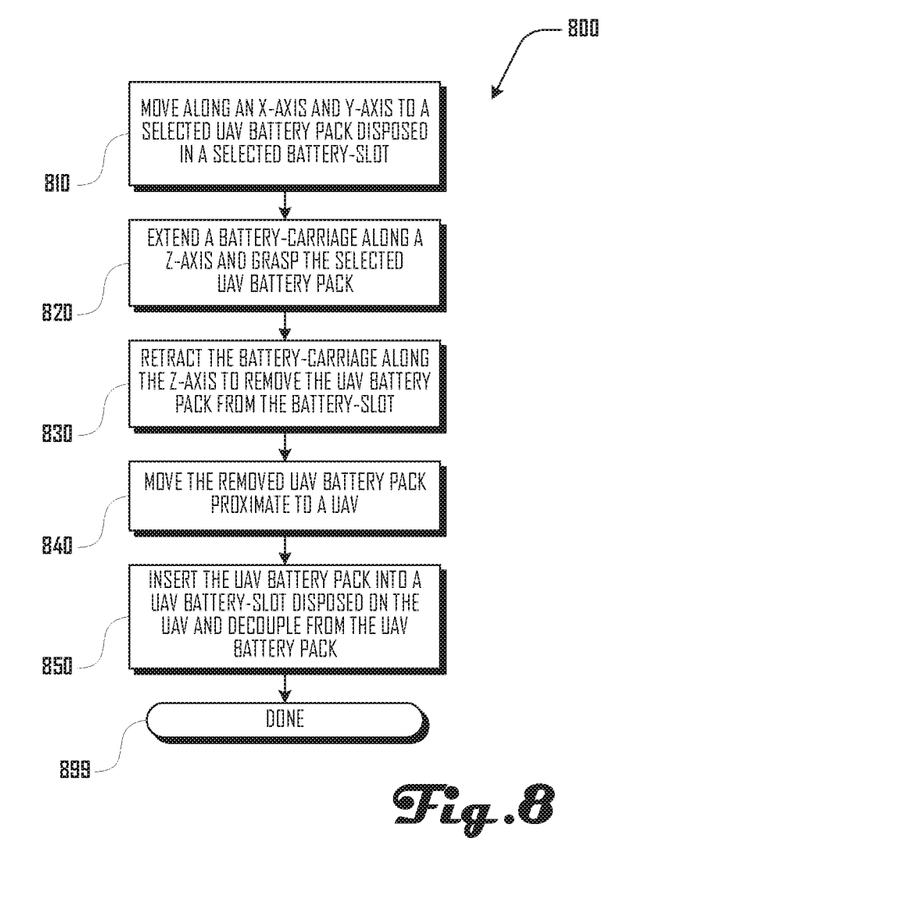
FIG. 8 is a block diagram of a method for inserting a UAV battery pack into a UAV in accordance with an embodiment.

Turning to FIG. 8 and the elements of FIGS. 1-5, a method 800 for inserting a UAV battery pack 120 into a UAV 400 is illustrated. The method 800 beings in block 810 where a robotic arm system 125 moves along an X-axis and Y-axis to a selected UAV battery pack 120 disposed in a selected battery-slot 115. In block 820, the robotic arm system 125 extends a battery-carriage 140 along a Z-axis and grasps the selected UAV battery pack 120. For example, the battery grabber 143 and/or grabber arms 144 may grasp the selected battery pack 120. In block 830, the robotic arm system 120 can retract the battery-carriage 140 along the Z-axis to remove the UAV battery pack 120 from the battery-slot 115.

In block 840, the robotic arm system 125 can move the removed UAV battery pack 120 proximate to the UAV 400. For example, in various embodiments, moving the removed UAV battery pack 120 proximate to the UAV 400 may comprise moving the battery-carriage 140 moving proximate to a hatch 405 and extending the battery-carriage 140 through the hatch 405 and proximate to the UAV 400 that is disposed on the top-plate 308 of the housing 105 in a battery-exchange zone 340.

In block 850, the robotic arm system 125 can insert the UAV battery pack 120 into the UAV battery-slot 510 disposed on the UAV 400 and decouple from the UAV battery pack 120. In various embodiments the battery grabber 143 and/or grabber arms 144 may decouple from the selected battery pack 120. The method 800 is done in block 899.

Figure 9:
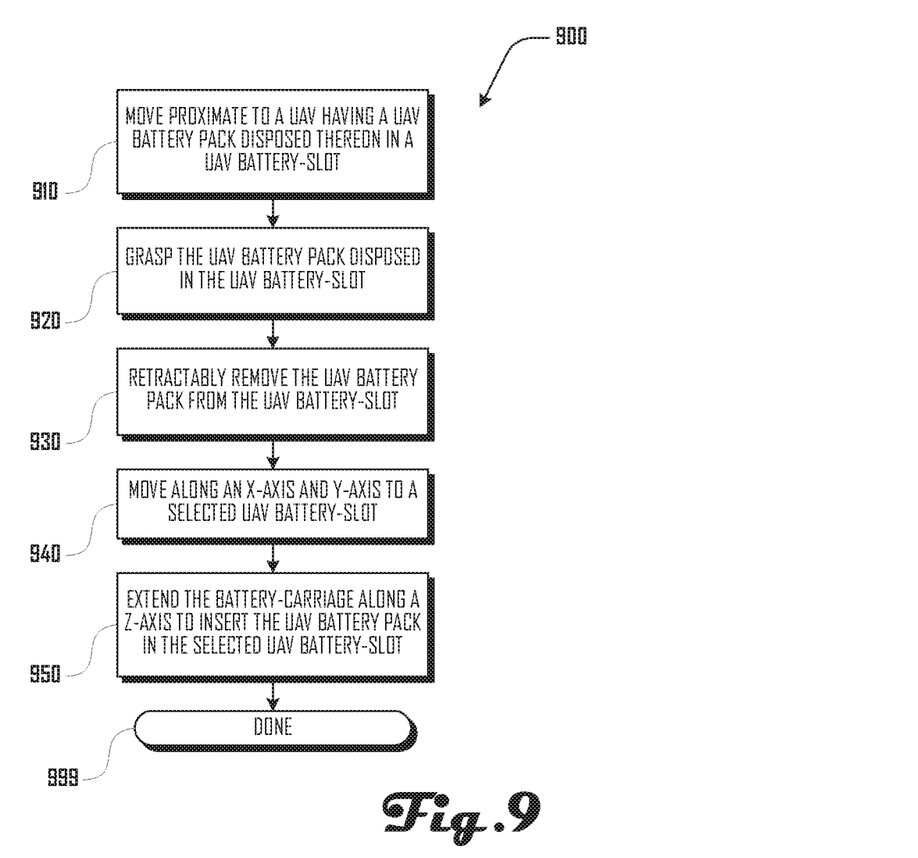
FIG. 9 is a block diagram of a method for removing a UAV battery pack from a UAV and storing the UAV battery pack in accordance with an embodiment.

FIG. 9 is a block diagram of a method 900 for removing a UAV battery pack 120 from a UAV 400 and storing the UAV battery pack 120 in accordance with an embodiment. The method 900 begins in block 910 where the robotic arm system 125 can move proximate to a UAV 400 having a UAV battery pack 120 disposed thereon in a UAV battery-slot 510. For example, in various embodiments, moving the robotic arm system 125 proximate to the UAV 400, may comprise moving the battery-carriage 140 proximate to a hatch 405 and extending the battery-carriage 140 through the hatch 405 and proximate to the UAV 400 that is disposed on the top-plate 308 of the housing 105 in a battery-exchange zone 340.

In block 920, the robotic arm system 125 can grasp the UAV battery pack 120 disposed in the UAV battery-slot 510. For example, the battery grabber 143 and/or grabber arms 144 may grasp the selected battery pack 120. In block 930 the robotic arm system 125 can retractably remove the UAV battery pack 120 from the UAV battery-slot 510.

In block 930, the robotic arm system 125 can move along the X-axis and Y-axis to a selected UAV battery-slot 155. For example, in various embodiments, moving along the X-axis and Y-axis to a selected UAV battery-slot 155 may include retracting through the hatch 405 into the internal cavity 108 of the housing 105 and moving the battery-carriage 140 in alignment with the selected UAV battery-slot 155.

In block 940, the robotic arm system 125 can extend the battery-carriage 140 along a Z-axis to insert the UAV battery pack 120 in the selected UAV battery-slot 115. In various embodiments, the battery pack 120 may be charged and/or stored in the battery-slot 115 for later charging.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. An unmanned aerial vehicle (UAV) base station comprising:
   a housing comprising a top-plate configured for a UAV to land on the top-plate, the top-plate including a hatch extending into a housing cavity of the housing, and the hatch including a hatch-door;
   a UAV fixation system configured to direct the UAV present on the top-plate to a battery-exchange zone of the top-plate, the battery-exchange zone being located next to the hatch along a non-vertical direction, the battery-exchange zone and the hatch-door being located on a same surface of the top-plate, and the hatch being located under the hatch-door along a direction perpendicular to the surface of the top-plate on which the hatch-door and the battery-exchange zone are located; and
   a battery-exchange system disposed within the housing cavity and including a mechanical mechanism, the mechanical mechanism including a robotic arm system configured to, in response to the UAV being at the battery exchange zone, move a battery pack along a vertical direction through the hatch from within the housing cavity to a battery-swapping position above the top-plate and then, after the battery pack is above the top-plate, move the battery pack above the top-plate along a horizontal direction towards the battery-exchange zone;
   wherein:
      the hatch-door is operable to cover the hatch when the mechanical mechanism is not extended through the hatch; and
      the robotic arm system includes a battery-carriage configured to grab the battery pack, a first motor configured to drive movement of the battery-carriage along the vertical direction, and a second motor configured to drive movement of the battery-carriage along the horizontal direction.

2. The UAV base station of claim 1, wherein the UAV fixation system comprises a first fixation arm and a second fixation arm configured to respectively translate along respective perpendicular axes.

3. The UAV base station of claim 2, wherein the first fixation arm and the second fixation arm extend perpendicularly to their respective translation axes.

4. The UAV base station of claim 2, further comprising:
   a first fixation-arm-actuation system and a second fixation-arm-actuation system disposed within the housing and configured to actuate the first fixation arm and the second fixation arm, respectively.

5. The UAV base station of claim 4, wherein:
   a first end of the first fixation arm extends through a slot in the top-plate and is coupled to the first fixation-arm-actuation system; and
   a second end of the first fixation arm abuts or slidably resides in a slot of a fixation rim on the top-plate, the fixation rim being configured to guide a movement of the UAV on the top-plate.

6. The UAV base station of claim 4,
   wherein one end of the second fixation arm extends through a slot in the top-plate and is coupled to the second fixation-arm-actuation system;
   the UAV base station further comprising:
      a fixation rim on the top-plate and arranged proximate to the one end of the second fixation arm, the fixation rim being configured to guide a movement of the UAV on the top-plate.

7. The UAV base station of claim 4, wherein:
   the first fixation-arm-actuation system comprises a first fixation-rail and a first fixation-carriage configured to translate on the first fixation-rail;
   the second fixation-arm-actuation system comprises a second fixation-rail and a second fixation-carriage configured to translate on the second fixation-rail; and
   the first fixation arm and the second fixation arm are coupled to the first fixation-carriage and the second fixation-carriage, respectively.

8. The UAV base station of claim 1, wherein the battery-exchange zone is arranged at a corner of the top-plate.

9. The UAV base station of claim 1, wherein the battery-change zone is one of four battery-exchange zones of the top-plate each arranged at one of four corners of the top-plate.

10. The UAV base station of claim 1, wherein:
    the battery-exchange system further includes a battery-matrix comprising a plurality of battery-slots, each configured to removably hold a UAV battery pack; and
    the mechanical mechanism is configured to move along at least two axes to interact with a selected UAV battery pack of the battery-exchange system and the UAV battery pack of the UAV.

11. The UAV base station of claim 10, wherein the mechanical mechanism is configured to:
    move along at least one of an X-axis or a Y-axis to the selected UAV battery pack disposed in a selected battery-slot;
    extend a battery-carriage along a Z-axis and grasp the selected UAV battery pack;
    retract the battery-carriage along the Z-axis to remove the selected UAV battery pack from the battery-slot; and
    move the selected UAV battery pack proximate to the UAV, insert the selected UAV battery pack into a UAV battery-slot of the UAV, and decouple from the selected UAV battery pack.

12. The UAV base station of claim 10, wherein the mechanical mechanism is configured to:
    move proximate to the UAV;
    grasp the UAV battery pack disposed in a UAV battery-slot of the UAV;
    retractably remove the UAV battery pack from the UAV battery-slot;
    move along at least one of an X-axis or a Y-axis to a selected UAV battery-slot; and
    extend a battery-carriage along a Z-axis to insert the UAV battery pack in the selected UAV battery-slot.

13. The UAV base station of claim 10, wherein the plurality of battery-slots are arranged in a two-dimensional array having a plurality of rows and columns.

14. The UAV base station of claim 10, wherein the mechanical mechanism comprises a base-cart configured to translate linearly along an X-axis on at least one base-rail.

15. The unmanned aerial vehicle base station of claim 14, wherein the mechanical mechanism further comprises:
    an elevator-carriage configured to translate linearly along a Y-axis on at least one elevator-rail that extends from the base-cart.

16. The UAV base station of claim 1, wherein the housing further comprises a top-plate cover configured to removably cover the top-plate.

17. The UAV base station of claim 1, wherein the housing further comprises a draw bar and wheels.

18. The UAV base station of claim 1, wherein the battery-exchange zone is located next to the hatch along a direction parallel to the surface of the top-plate on which the hatch-door and the battery-exchange zone are located.

19. An unmanned aerial vehicle (UAV) base station comprising:
   a housing comprising a top-plate configured for a UAV to land on the top-plate, the top-plate including a hatch extending into a housing cavity of the housing, and the hatch including a hatch-door;
   a UAV fixation system configured to direct the UAV present on the top-plate to a battery-exchange zone of the top-plate, the battery-exchange zone and the hatch-door being located on a same surface of the top-plate, and the hatch being located under the hatch-door along a direction perpendicular to the surface of the top-plate on which the hatch-door and the battery-exchange zone are located; and
   a battery-exchange system disposed within the housing cavity and including a mechanical mechanism, the mechanical mechanism including a robotic arm system configured to, in response to the UAV being at the battery-exchange zone, move a battery pack along a vertical direction through the hatch from within the housing cavity to a battery-swapping position above the top-plate and then, after the battery pack is above the top-plate, move the battery pack above the top-plate along a horizontal direction towards the battery-exchange zone;
   wherein the robotic arm system includes a battery-carriage configured to grab the battery pack, a first motor configured to drive movement of the battery-carriage along the vertical direction, and a second motor configured to drive movement of the battery-carriage along the horizontal direction.

20. The UAV base station of claim 1, wherein the robotic arm system further includes an elevator carriage configured to move along an up-down direction, and a rod positioned on the elevator carriage and configured to open the hatch-door in response to the elevator carriage moving upward.

\* \* \* \* \*